J. H. MERTZ.
LAMP AND TAG SUPPORT FOR VEHICLES.
APPLICATION FILED MAR. 4, 1912.
1,112,823.
Patented Oct. 6, 1914.
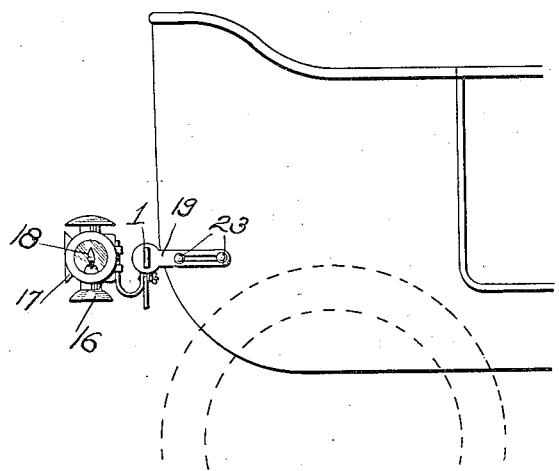
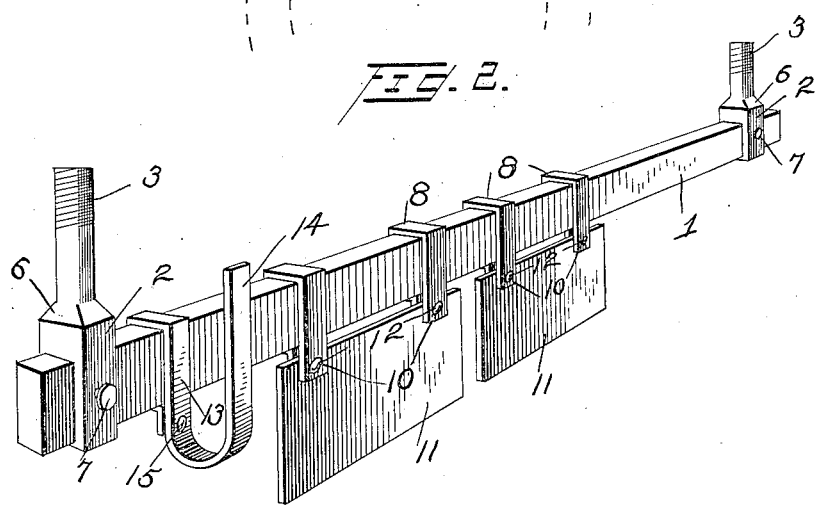
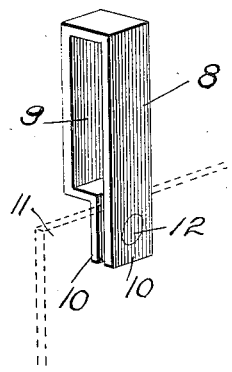
WITNESSES
INVENTOR
Jacob H. Mertz

UNITED STATES PATENT OFFICE.

JACOB H. MERTZ, OF WASHINGTON, DISTRICT OF COLUMBIA, ASSIGNOR OF ONE-HALF TO GEORGE F. BELL, OF BLUEFIELD, WEST VIRGINIA.

LAMP AND TAG SUPPORT FOR VEHICLES.

1,112,823.

Specification of Letters Patent.

Patented Oct. 6, 1914.

Application filed March 4, 1912. Serial No. 681,467.

*To all whom it may concern:*

Be it known that I, JACOB H. MERTZ, a citizen of the United States of America, residing at Washington, in the District of Columbia, have invented certain new and useful Improvements in Lamp and Tag Supports for Vehicles, of which the following is a specification.

This invention relates to supports for lamps and tags for vehicles and one of the principal objects of the invention is to provide simple, reliable and efficient means for supporting the number tags on automobiles and other vehicles in position to be readily seen at night by the light thrown out from the lamp supported at one side of the tags.

Still another object of the invention is to provide a supporting bar suspended from brackets, said supporting bar being arranged horizontally for slidably supporting clips for the tags, said bar being readily detachable for attaching the tags.

These and other objects may be attained by means of the construction shown and illustrated in the accompanying drawing, in which:—

Figure 1 is a side elevation of the rear portion of a vehicle showing the bar applied. Fig. 2 is a detail perspective view of the supporting bar and modified devices for securing it in place on the rear end of the vehicle. Fig. 3 is a detail perspective view of one of the supporting clips for the tags.

Referring to the drawing for a more particular description of my invention, the numeral 1 designates a bar supported at the rear portion of the vehicle, as shown in Fig. 1. As shown in Fig. 2, the bar 1 may be supported in eye-bolts 2, said eye-bolts having screw-threaded shanks 3 adapted to pass through any suitable part of the body of the vehicle and to be connected thereto by means of suitable nuts (not shown). The eye-bolts 2 are provided with tapering squared portions 6 to be countersunk in the body to prevent the eye-bolts from turning when properly secured in place. The eyes of the bolts 2 are rectangular in form to accommodate the ends of the bar 1, and binding screws 7 extend through the eyes and against the bar 1 for holding it rigidly in place when adjusted.

Clips 8 are each provided with a rectangular eye 9 to slide on the bar 1, said clips having spaced lugs 10 between which the metal tags 11 are secured by means of suitable binding screws 12. The binding screws 12, when properly turned in place, will clamp the eye 9 onto the bar 1 and prevent it from moving longitudinally thereof and also secure the tags rigidly in place to prevent movement thereof. Any suitable number of these clips may be secured to the bar 1 for the attachment of additional tags whenever required.

It will be observed that the bar 1 is quadrilateral and rectangular in cross section and that the eyes 9 of the clips 8 snugly receive or bear against four of the sides of the bar. When the traction bolts 12 are loose the clips 8 are free to be slid along the bar, but when the bolts 12 are tightened the clips positively grip the bar and are securely held against movement longitudinally of the bar. Furthermore, the opposite inner surfaces of the lugs 10 of each clip are parallel throughout the extent of their area and consequently when the bolts 12 are tightened the said parallel surfaces bear directly against the surfaces of the tag 11 and the tag is positively held against movement with relation to the clips. Again the clips and bolts 12 hold the tag 11 under the bar 1 with its obverse surface lying in the same plane as that in which one surface of the bar 1 lies and therefore the bar protects the tag from above and at the same time the bar does not extend over the obverse surface of the tag and cast a shadow on the same. In other words, when the bolts 12 are tight, all of the said parts are positively held in fixed adjusted positions with relation to each other and when the bolts 12 are loose all of the said parts are readily adjustable with relation to each other. A lamp bracket 13 is also secured to the bar 1, said bracket having an upwardly extending hook or support 14, said bracket being secured to the bar 1 by means of a suitable screw 15, thus rendering the lamp adjustable lengthwise on the bar 1 and to permit the detachment of the lamp whenever desired.

The lamp 16, which may be of any suitable type, is provided with a plain glass at the side 18 and owing to the disposition relatively to the tags 11, the light is thrown onto the tags so they may be seen at any time in the night. The rear glass 17 of the lamp is red, to comply with regulations.

Some automobiles and other vehicles are not provided with a cut under rear end and for this reason a different form of bracket is required for supporting the bar 1. I have provided a bracket, shown in Fig. 1, comprising a shank 19 having a longitudinal slot 20 and a rounded head 21 having a vertical slot 22 for supporting the ends of the bar 1. These brackets are secured at the sides of the body of the vehicle by means of suitable binding screws 23.

From the foregoing, it will be obvious that a support for tags and a lamp made in accordance with my invention can be quickly disconnected for the purpose of adding new tags to the bar and for the adjustment of the tags longitudinally of the bar. Moreover, the lamp may be readily adjusted at the required position on the bar for shedding light onto the tags.

Having thus fully described my invention, what I claim as new, is:—

A tag support comprising a bar which is quadrilateral and rectangular in cross section, a clip having spaced end portions the opposed surfaces of which are parallel throughout their areas, said clip also having angularly disposed intermediate portions which snugly fit against three of the sides of the bar, one of the said end portions of the clip fitting along a portion of its inner surface against the fourth side of the bar, a tag located between the said parallel end portions of the clip and having its obverse surface bearing directly against the remaining portion of the inner surface of that end portion of the clip which fits against the said fourth surface of the bar whereby the obverse surface of the tag lies in the same plane as that in which the said fourth side of the bar lies, and a traction means passing transversely through the said end portions of the clip and through the tag and drawing the said end portions in close contact with the opposite sides of the tag to prevent relative movement of the tag and the clip, and positively fixing the obverse surface of the tag in the plane of the said fourth side of the bar, said traction means also drawing the clip in close contact with the sides of the bar whereby the clip and tag are positively held against movement with relation to the bar.

In testimony whereof I affix my signature in presence of two witnesses.

JACOB H. MERTZ.

Witnesses:
GEO. S. LIVINGSTON,
GEORGE F. BELL.